United States Patent [19]
Umeda

[11] Patent Number: 5,875,060
[45] Date of Patent: Feb. 23, 1999

[54] ZOOM LENS SYSTEM

[75] Inventor: Hiromu Umeda, Kashiwara, Japan

[73] Assignee: Minolta Co., Ltd., Osaka, Japan

[21] Appl. No.: 604,449

[22] Filed: Feb. 21, 1996

[30] Foreign Application Priority Data

Feb. 24, 1995 [JP] Japan .................................. 7-036594

[51] Int. Cl.⁶ .................................................. G02B 15/14
[52] U.S. Cl. ......................... 359/691; 359/682; 359/739
[58] Field of Search ...................... 359/681, 682, 359/691, 696, 782, 793, 739, 688, 689, 687, 713–717, 680

[56] References Cited

U.S. PATENT DOCUMENTS

| | | | |
|---|---|---|---|
| 4,390,248 | 6/1983 | Ikemori | 359/688 |
| 4,711,533 | 12/1987 | Saito | 359/681 |
| 4,726,666 | 2/1988 | Ota et al. | 359/681 |
| 4,999,007 | 3/1991 | Aoki et al. | 359/676 |
| 5,054,897 | 10/1991 | Ozawa | 359/691 |
| 5,280,390 | 1/1994 | Ito | 359/691 |
| 5,283,693 | 2/1994 | Kohno et al. | 359/691 |
| 5,329,401 | 7/1994 | Sato | 359/691 |
| 5,339,195 | 8/1994 | Ogata | 359/691 |
| 5,602,680 | 2/1997 | Sakamoto | 359/691 |
| 5,663,836 | 9/1997 | Ogata | 359/691 |

*Primary Examiner*—Georgia Epps
*Assistant Examiner*—Jordan M. Schwartz
*Attorney, Agent, or Firm*—Price Gess & Ubell

[57] ABSTRACT

A zoom lens system includes, in order from the object side to the image side, a first lens unit, having a negative refractive power, which moves along an optical axis during a zooming operation, a stop diaphragm which moves along the optical axis with the first lens unit at one body during the zooming operation, and a second lens unit having a positive refractive power.

17 Claims, 8 Drawing Sheets

FIG. 6A
FNO=8.80

—— d
----- SC

-2.0  2.0
SPHERICAL SINE
ABERRATION CONDITION

-2.0  2.0
ASTIGMATISM

FIG. 6C
Y'=21.6

-2.0  2.0
DISTORTION %

FIG. 6D
FNO=11.02

—— d
----- SC

-2.0  2.0
SPHERICAL SINE
ABERRATION CONDITION

-2.0  2.0
ASTIGMATISM

FIG. 6F
Y'=21.6

-2.0  2.0
DISTORTION %

FIG. 6G
FNO=13.89

—— d
----- SC

-2.0  2.0
SPHERICAL SINE
ABERRATION CONDITION

-2.0  2.0
ASTIGMATISM

FIG. 6I
Y'=21.6

-2.0  2.0
DISTORTION %

FIG. 7A
FNO=8.80

— d
---- SC

-2.0   2.0
SPHERICAL   SINE
ABERRATION  CONDITION

-2.0   2.0
ASTIGMATISM

FIG. 7C
Y'=21.6

-2.0   2.0
DISTORTION %

FIG. 7D
FNO=11.02

— d
---- SC

-2.0   2.0
SPHERICAL   SINE
ABERRATION  CONDITION

-2.0   2.0
ASTIGMATISM

FIG. 7F
Y'=21.6

-2.0   2.0
DISTORTION %

FIG. 7G
FNO=13.89

— d
---- SC

-2.0   2.0
SPHERICAL   SINE
ABERRATION  CONDITION

-2.0   2.0
ASTIGMATISM

FIG. 7I
Y'=21.6

-2.0   2.0
DISTORTION %

FIG. 8A
FNO=8.80

FIG. 8D
FNO=11.02

FIG. 8G
FNO=13.90

FIG. 9A
FNO=8.80

—— d
---- SC

-2.0  2.0
SPHERICAL SINE
ABERRATION CONDITION

-2.0  2.0
ASTIGMATISM

FIG. 9C
Y'=21.6

-2.0  2.0
DISTORTION %

FIG. 9D
FNO=11.02

—— d
---- SC

-2.0  2.0
SPHERICAL SINE
ABERRATION CONDITION

-2.0  2.0
ASTIGMATISM

FIG. 9F
Y'=21.6

-2.0  2.0
DISTORTION %

FIG. 9G
FNO=13.89

—— d
---- SC

-2.0  2.0
SPHERICAL SINE
ABERRATION CONDITION

-2.0  2.0
ASTIGMATISM

FIG. 9I
Y'=21.6

-2.0  2.0
DISTORTION %

FIG. 10A
FNO=8.80

-2.0   2.0
SPHERICAL  SINE
ABERRATION CONDITION

FIG. 10B
Y'=21.6

-2.0   2.0
ASTIGMATISM

FIG. 10C
Y'=21.6

-2.0   2.0
DISTORTION %

FIG. 10D
FNO=11.02

-2.0   2.0
SPHERICAL  SINE
ABERRATION CONDITION

FIG. 10E
Y'=21.6

-2.0   2.0
ASTIGMATISM

FIG. 10F
Y'=21.6

-2.0   2.0
DISTORTION %

FIG. 10G
FNO=13.89

-2.0   2.0
SPHERICAL  SINE
ABERRATION CONDITION

FIG. 10H
Y'=21.6

-2.0   2.0
ASTIGMATISM

FIG. 10I
Y'=21.6

-2.0   2.0
DISTORTION %

5,875,060

ZOOM LENS SYSTEM

BACKGROUND OF THE INVENTION

1. Field of the Invention

The present invention relates to a zoom lens system, and more specifically, to a compact and lightweight two lens unit zoom lens system.

2. Description of the Prior Art

Conventionally, it has been difficult to produce zoom lens systems for cameras (e.g. instant cameras) using film of sizes larger than the standard size film (135 mm film). This is because the lens movement amount for focusing and the lens movement amount for zooming should be large for the zoom lens system used in such a camera because of the greatness of the film size. This increases the size of the peripheral mechanical construction and the size of the camera body becomes excessively large as a result.

SUMMARY OF THE INVENTION

In view of the aforementioned problem, an object of the present invention is to provide a compact and lightweight zoom lens system employable in a camera using large size film.

Another object of the present invention is to provide a zoom lens system having minimum lens movement amounts for focusing and zooming and a minimum number of lens elements.

Still another object of the present invention is to provide a zoom lens system having a long back focal length even when employed in a camera using large size film.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

A two lens unit zoom lens system according to a first implementation of the present invention comprises from the object side a front lens unit of a negative refractive power and a rear lens unit of a positive refractive power. Zooming is performed by varying the air space between the front and rear lens units. A stop diaphragm which moves together with the front lens unit as one body during zooming is disposed behind the front lens unit.

A two lens unit zoom lens system according to a second implementation of the present invention comprises from the object side a front lens unit of a negative refractive power and a rear lens unit of a positive refractive power. Zooming is performed by varying the air space between the front and rear lens units. The front lens unit includes only spherical lens elements. A stop diaphragm which moves together with the front lens unit as one body during zooming is disposed behind the front lens unit. Focusing is performed by moving out the front lens unit. The following condition (1) is fulfilled:

$$-0.025 < \alpha_1 < -0.008 \quad (1)$$

where $\alpha_1$ is the refractive power of the front lens unit.

The zoom lens system according to the second implementation may fulfill the following condition (2) instead of the condition (1):

$$-2.5 \times 10^{-4} < \frac{\alpha_1}{f_W} < -0.8 \times 10^{-4} \quad (2)$$

where $f_W$ is the shortest focal length (95.0 in first to fifth embodiments shown later).

According to the first and second implementations, since the stop diaphragm disposed behind the front lens unit is moved together with the front lens unit at one body during zooming, the weight of the lens system is reduced by decreasing the effective aperture of the front lens unit. Further, since the light passage height of the front lens unit is small, the amount of aberration to be corrected by the first lens unit is reduced. This enables the front lens unit to be formed of two spherical lens elements. By forming the front lens unit of two spherical lens elements, the reduction in overall size of the zoom lens system is achieved, so that the load on the focusing mechanism is reduced.

According to the second implementation, focusing is performed by moving out the front lens unit. Since the effective aperture of the front lens unit may be small as set forth above, in such an arrangement, a space for the shutter mechanism is secured around the front lens unit. Thus, the mechanical structure is effectively arranged.

By disposing the stop diaphragm in the manner described above, the light passage height of the rear lens unit is large, so that it becomes effective to use an aspherical surface in the rear lens unit. By using an aspherical surface, the number of lens elements is minimized. This enables the reduction in size and weight.

According to the second implementation, since focusing is performed by moving out the front lens unit, the moving out amount for focusing (focusing movement amount) depends on the refractive power of the front lens unit. Further, the movement amount of each lens unit for zooming (zooming movement amount) also depends on the refractive power of the front lens unit. Therefore, the refractive power of the front lens unit should be decided so that both the focusing movement amount and the zooming movement amount are appropriate. The condition (1) is for achieving this.

When the lower limit of the condition (1) is exceeded, the zooming movement amount (from a shorter focal length condition to a longer focal length condition) increases, so that the overall length of the lens system is large at the longest focal length condition. Conversely, when the upper limit of the condition (1) is exceeded, the focusing movement amount increases.

When the lower limit of the condition (2) is exceeded, the zooming movement amount (from a shorter focal length condition to a longer focal length condition) increases, so that the overall length of the lens system is large at the longest focal length condition. Conversely, when the upper limit of the condition (2) is exceeded, the focusing movement amount increases.

By using plastic lenses as a negative lens element in the rear lens unit and as a positive lens element in the front lens unit, the image point shift due to a temperature change is corrected and the reduction in weight is achieved. The use of plastic lenses is effective in the weight reduction. However, since the thermal expansion of plastic lenses is great, if only the positive lens element or only the negative lens element is a plastic lens, the image point shift due to a temperature change increases. If both the positive and negative lens elements are plastic lenses, the image point shifts by these lenses cancel each other.

Preferably, in the rear lens unit, the most object side lens element has a positive refractive power and the most image side lens element has a negative refractive power. Disposing a positive lens element on the most object side enables the rear principal point to approach the object side, so that a back focal length is obtained which is appropriate for the entire camera body (i.e. it is prevented that the back focal length is excessively long). Disposing a negative lens element on the most image side enables the effective aperture of the rear lens unit to be curbed, so that the lens configuration is made compact.

Preferably, the rear lens unit has at least one aspherical surface. In view of the structure of the camera body, disposing the stop diaphragm behind the front lens unit as set forth above enables the reduction in outer diameter of the front lens unit. Although this increases the outer diameter of the rear lens unit to increase the amount of aberration to be corrected by the rear lens unit, the use of an aspherical surface in the rear lens unit increases the effect of the aspherical surface and this leads to the reduction in number of lens elements of the rear lens unit.

Numerical data of the first to fifth embodiments of the present invention are shown in Tables 1 to 5. In each table, ri (i=1,2,3, ... ) represents the radius of curvature of an ith lens surface counted from the object side, di (i=1,2,3, ... ) represents an ith axial distance counted from the object side, Ni (i=1,2,3, ... ) and vi (i=1,2,3, ... ) represent the refractive index to d-line and the Abbe number of an ith lens element counted from the object side, respectively. The focal length f and the F number of the entire lens system at the shortest focal length condition (W), at the middle focal length condition (M) and at the longest focal length condition (T) are also shown.

In each table, the surfaces marked with asterisks are aspherical and defined by the following expression representing the configuration of an aspherical surface:

$$X = \frac{C \cdot Y^2}{1 + (1 - \epsilon \cdot Y^2 \cdot C^2)^{\frac{1}{2}}} + \sum_i Ai Y^i$$

where X is a displacement amount from a reference surface along the optical axis, Y is a height in a direction vertical to the optical axis, C is a paraxial curvature, $\epsilon$ is a conic constant, and Ai is an ith aspherical coefficient.

Figure 1:
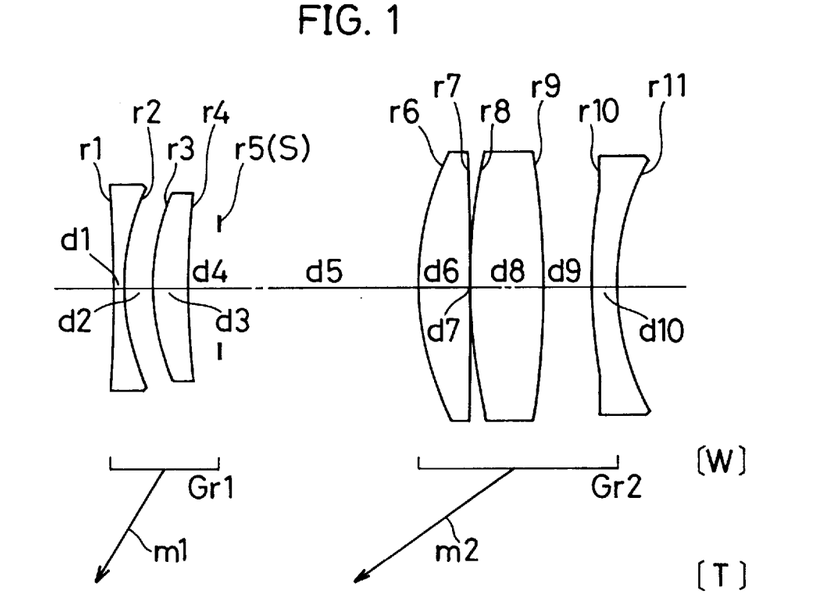
FIG. 1 is a cross-sectional view showing the lens arrangement of a first embodiment of the present invention.
Figure 2:
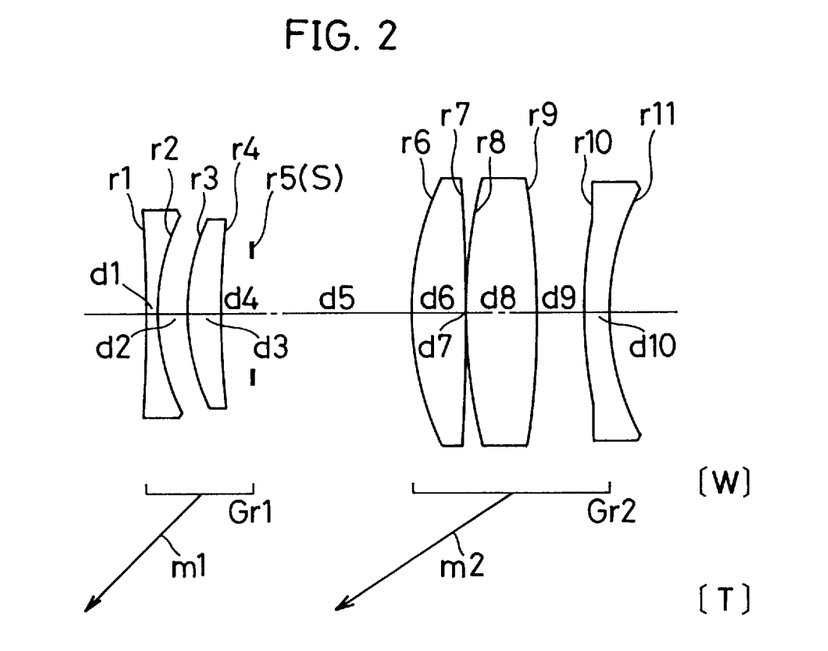
FIG. 2 is a cross-sectional view showing the lens arrangement of a second embodiment of the present invention.
Figure 3:
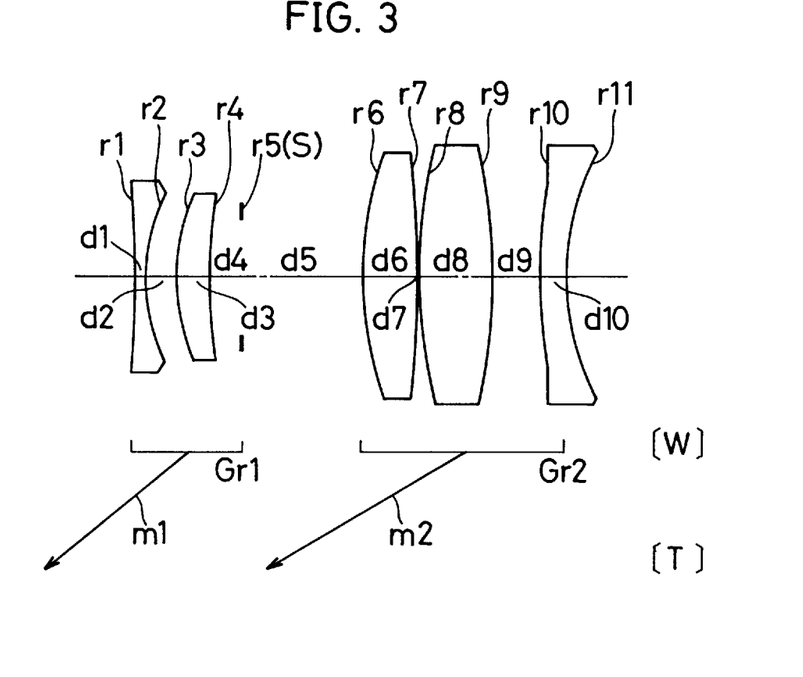
FIG. 3 is a cross-sectional view showing the lens arrangement of a third embodiment of the present invention.
Figure 4:
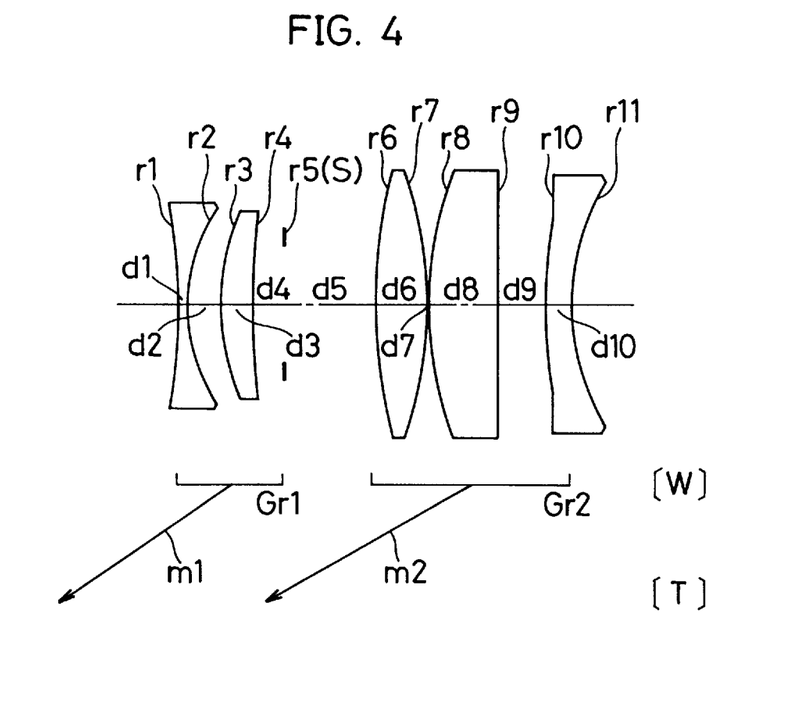
FIG. 4 is a cross-sectional view showing the lens arrangement of a fourth embodiment of the present invention.
Figure 5:
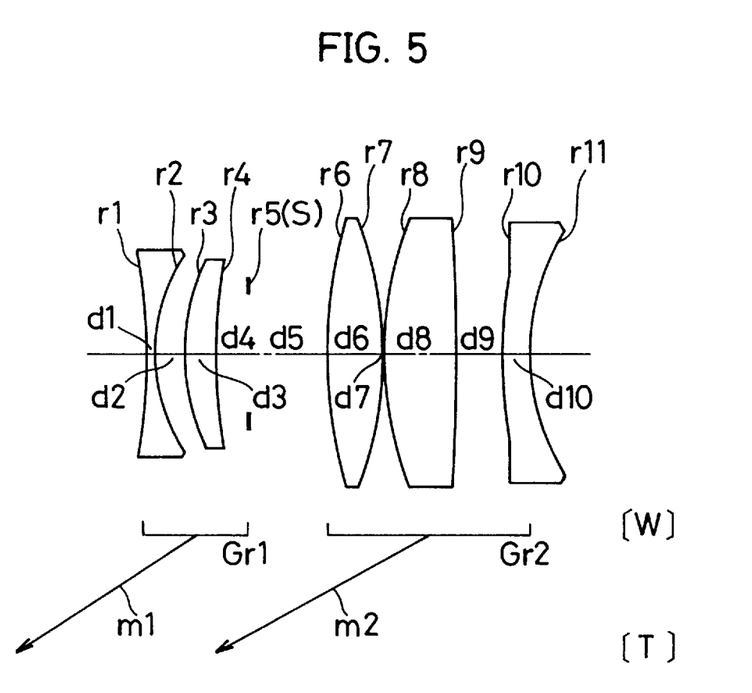
FIG. 5 is a cross-sectional view showing the lens arrangement of a fifth embodiment of the present invention.

FIGS. 1 to 5 are cross-sectional views showing the lens arrangements of the first to fifth embodiments at the shortest focal length condition (W). In these figures, the arrows m1 and m2 schematically show the movements of the front lens unit Gr1 and the rear lens unit Gr2 during zooming from the shortest focal length condition (W) to the longest focal length condition (T).

The first to fifth embodiments are two lens unit zoom lens systems comprising from the object side a front lens unit Gr1 of a negative refractive power, a stop diaphragm S and a rear lens unit Gr2 of a positive refractive power. Zooming is performed by varying the air space between the front lens unit Gr1 and the rear lens unit Gr2. The front lens unit Gr1 includes only spherical lens elements. The stop diaphragm S moves together with the front lens unit Gr1 during zooming. Focusing is performed by moving out the front lens unit Gr1.

In the first embodiment, the front lens unit Gr1 includes a bi-concave negative lens element and a positive meniscus lens element convex to the object side, and the rear lens unit Gr2 includes a positive meniscus lens element convex to the object side, a bi-convex positive lens element and a bi-aspherical negative meniscus lens element concave to the image side. In the second, third and fifth embodiments, the front lens unit Gr1 includes a bi-concave negative lens element and a positive meniscus lens element convex to the object side, and the rear lens unit Gr2 includes two bi-convex positive lens elements and a bi-aspherical negative meniscus lens element concave to the image side. In the fourth embodiment, the front lens unit Gr1 includes a bi-concave negative lens element and a positive meniscus lens element convex to the object side, and the rear lens unit Gr2 includes a bi-convex positive lens element, a positive meniscus lens element convex to the object side and a bi-aspherical negative meniscus lens element concave to the image side.

Figure 6A:
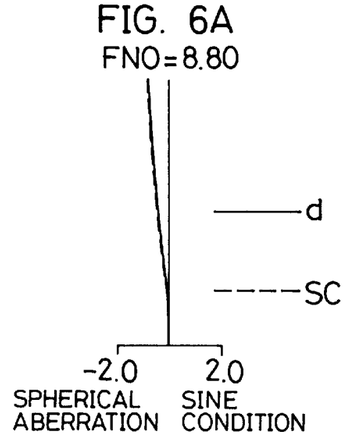
FIGS. 6A to 6I show aberration curves of the first embodiment of the present invention.
Figure 6B:
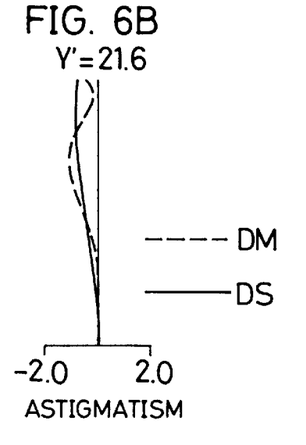
Figure 6C:
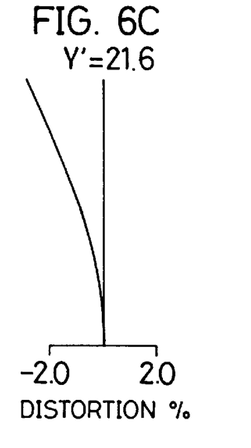
Figure 6D:
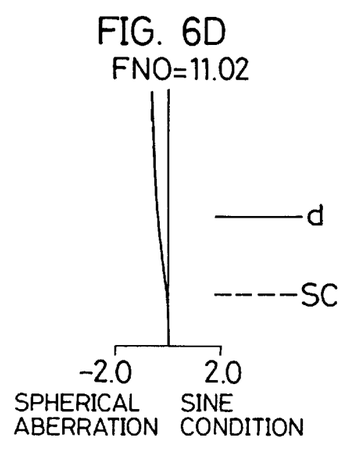
Figure 6E:
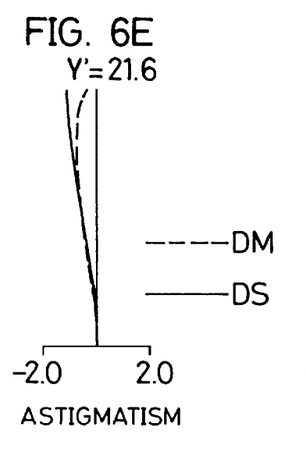
Figure 6F:
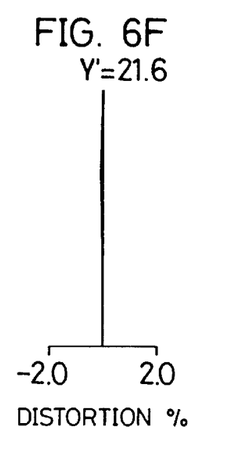
Figure 6G:
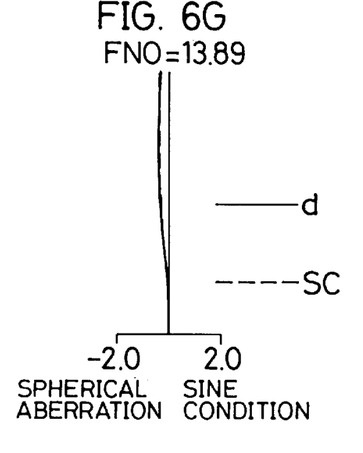
Figure 6H:
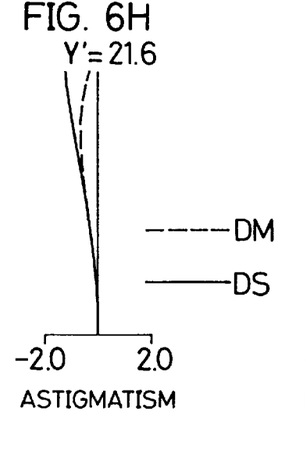
Figure 6I:
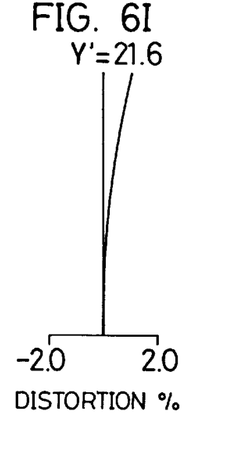
Figure 7A:
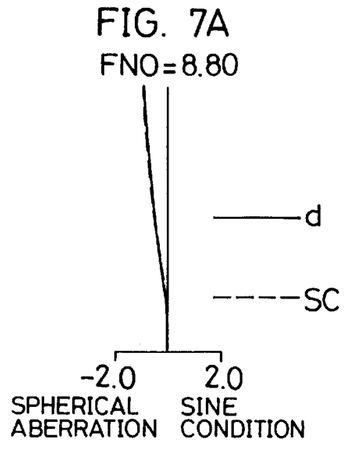
FIGS. 7A to 7I show aberration curves of the second embodiment of the present invention.
Figure 7B:
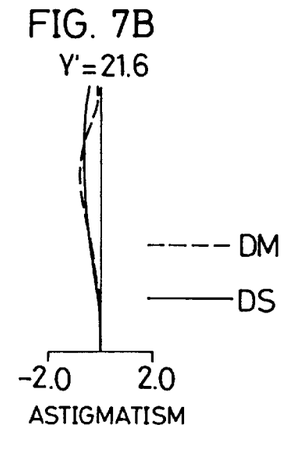
Figure 7C:
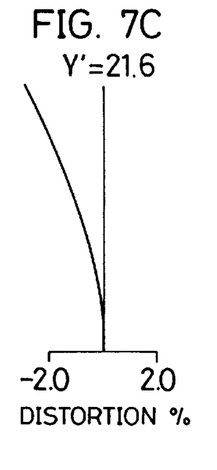
Figure 7D:
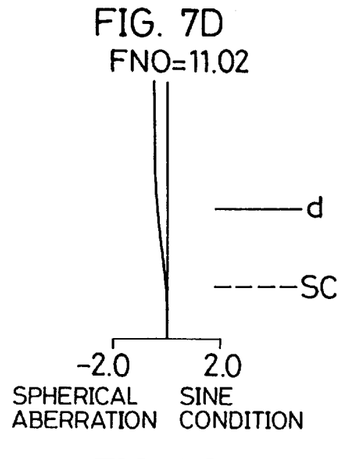
Figure 7E:
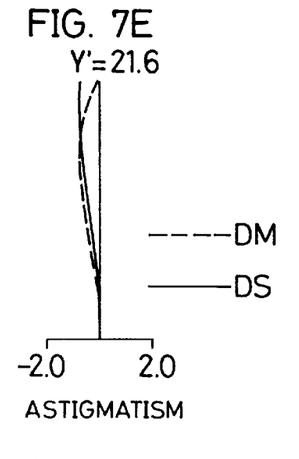
Figure 7F:
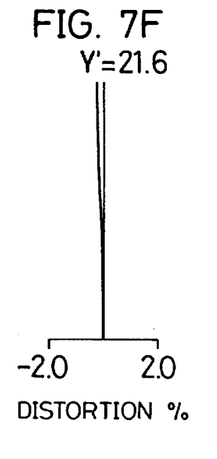
Figure 7G:
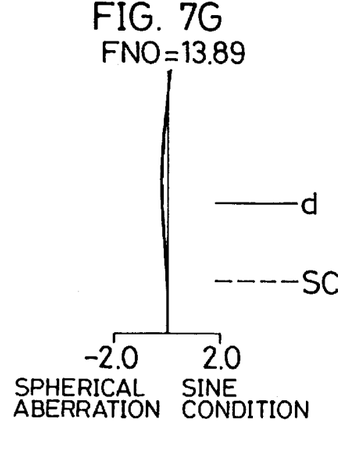
Figure 7H:
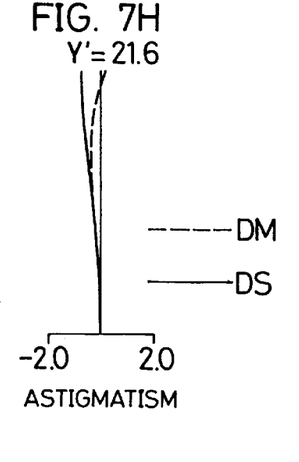
Figure 7I:
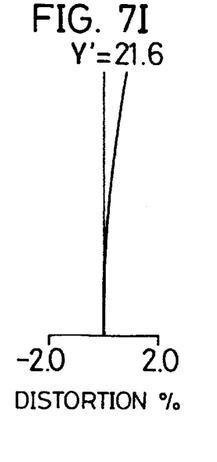
Figures 8A, 8B:
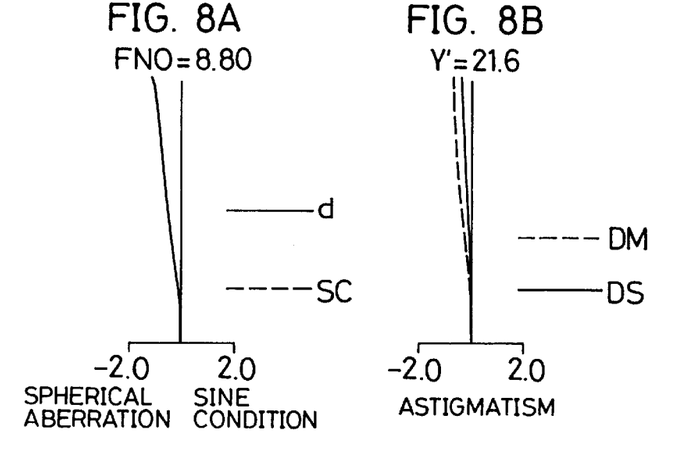
FIGS. 8A to 8I show aberration curves of the third embodiment of the present invention.
Figure 8C:
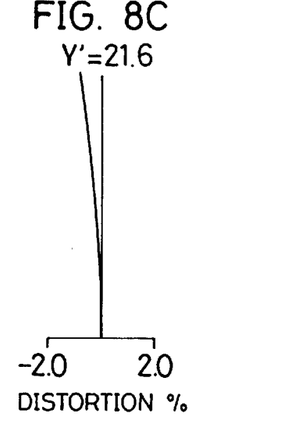
Figures 8D, 8E:
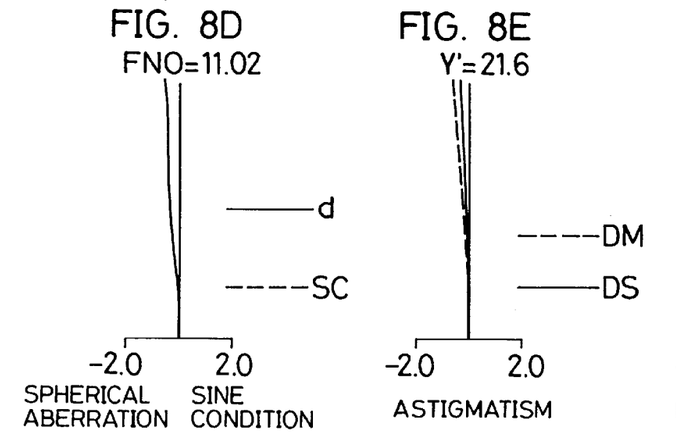
Figure 8F:
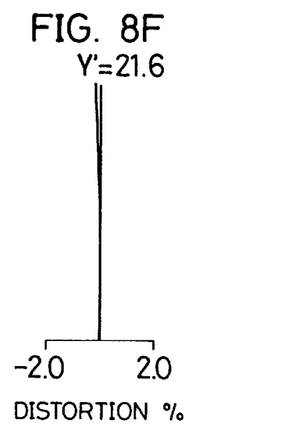
Figures 8G, 8H:
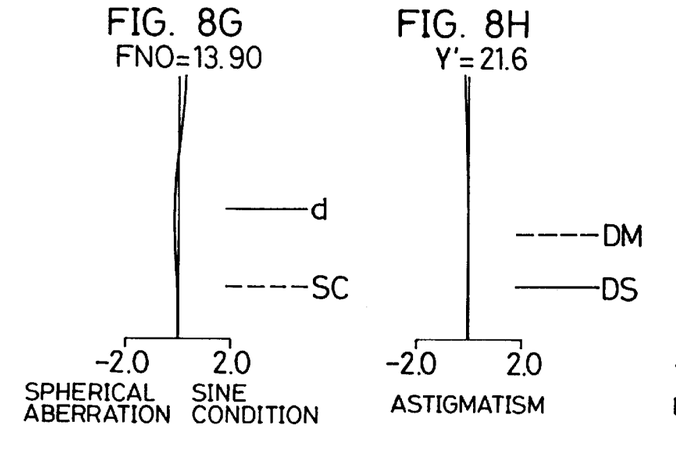
Figure 8I:
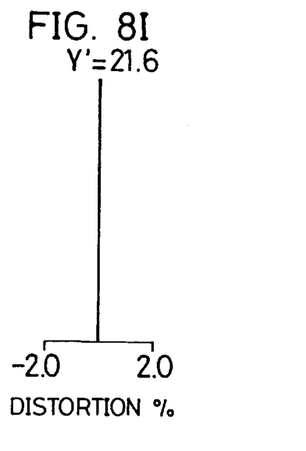
Figure 9A:
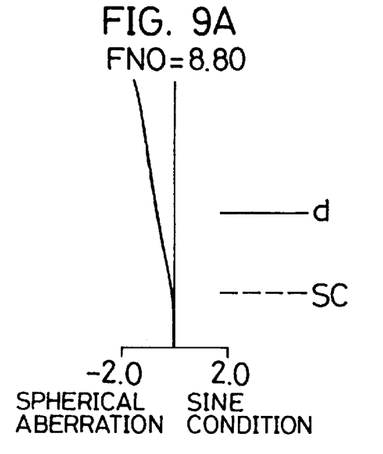
FIGS. 9A to 9I show aberration curves of the fourth embodiment of the present invention.
Figure 9B:
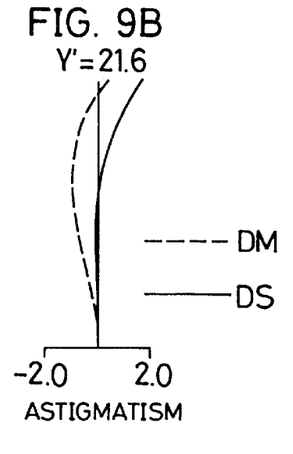
Figure 9C:
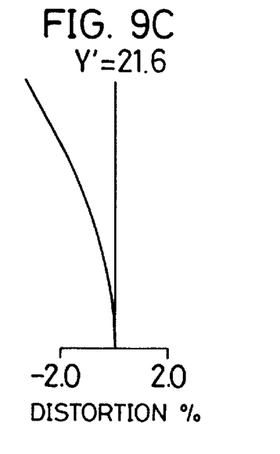
Figure 9D:
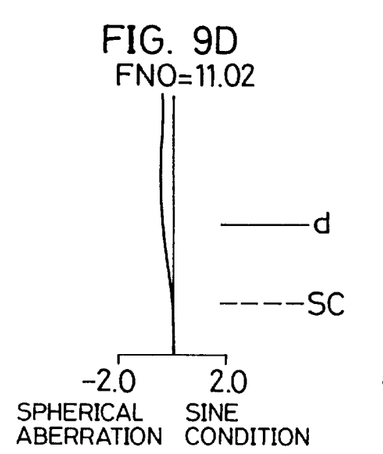
Figure 9E:
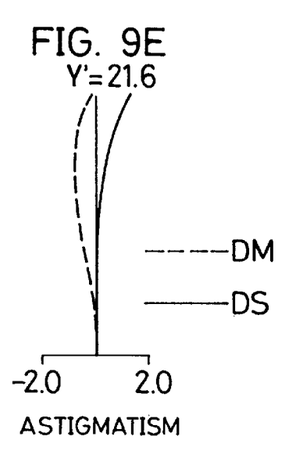
Figure 9F:
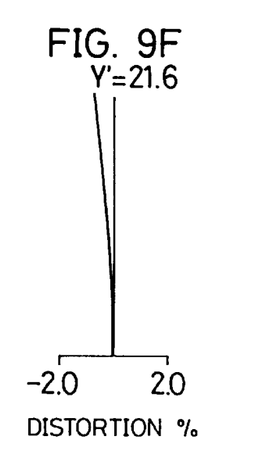
Figure 9G:
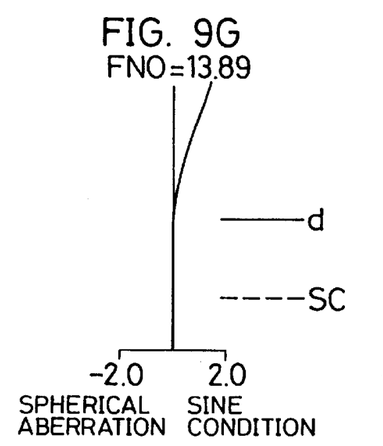
Figure 9H:
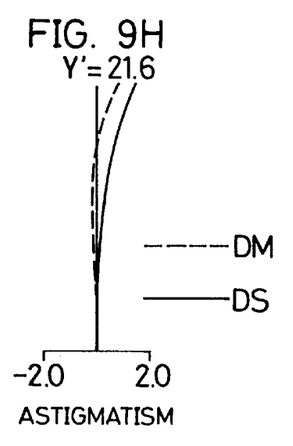
Figure 9I:
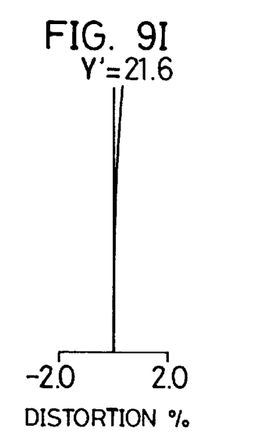
Figure 10A:
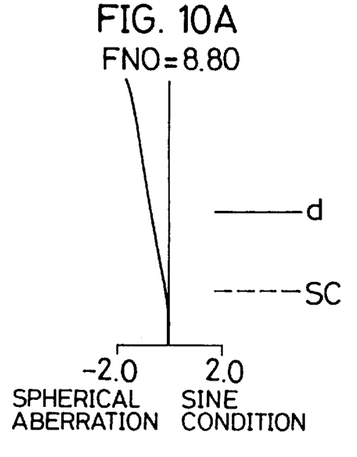
FIGS. 10A to 10I show aberration curves of the fifth embodiment of the present invention.
Figure 10B:
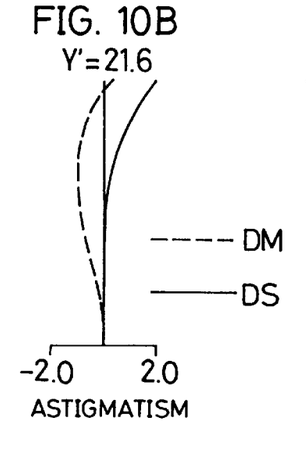
Figure 10C:
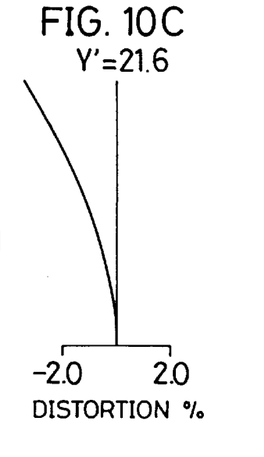
Figure 10D:
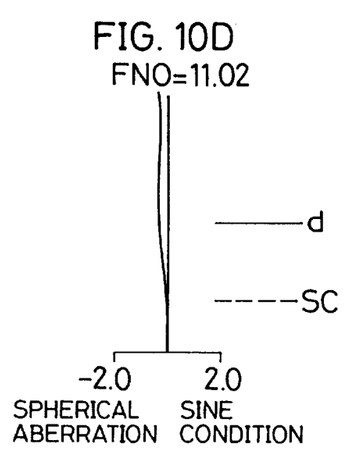
Figure 10E:
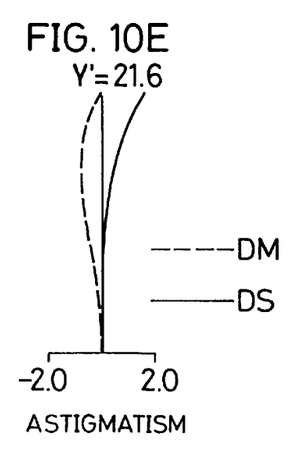
Figure 10F:
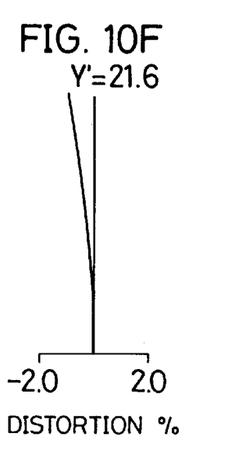
Figure 10G:
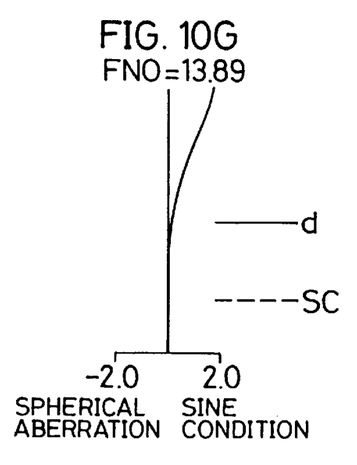
Figure 10H:
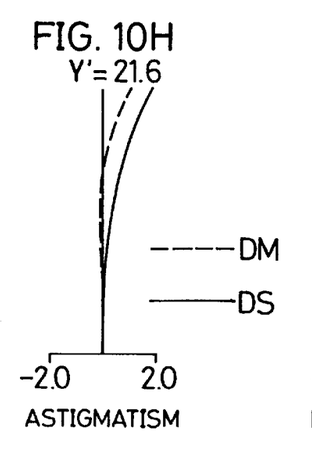
Figure 10I:
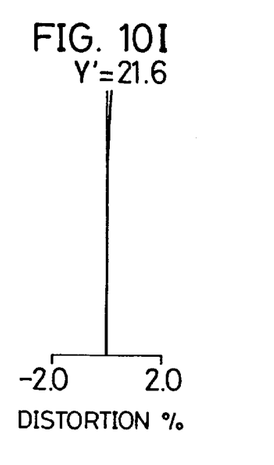

FIGS. 6A to 6I through 10A to 10I show aberration curves of the first to fifth embodiments. FIGS. 6A to 6C through 10A to 10C show aberration curves at the shortest focal length condition (W). FIGS. 6D to 6F through 10D to 10F show aberration curves at the middle focal length condition (M). FIGS. 6G to 6I through 10G to 10I show aberration curves at the longest focal length condition (T). The solid line d represents an aberration to d-line. The broken line SC represents a sine condition. The broken line DM and the solid line DS represent astigmatisms on the meridional and sagittal image planes, respectively.

Table 6 shows the values for the conditions (1) and (2), the total lengths of the lens systems, the zooming movement amounts and the focusing movement amounts (object distance: infinity to 1m) in the first to fifth embodiments.

As described above, according to the first and second implementations, a compact and lightweight two lens unit zoom lens system is realized which is suitable for use in an instant camera.

Obviously, many modifications and variations of the present invention are possible in light of the above teachings. It is therefore to be understood that within the scope of the appended claims, the invention may be practiced other than as specifically described.

TABLE 1

(1st Embodiment)

f = 95.0 to 119.0 to 150.0    FNO = 8.80 to 11.02 to 13.89

| | Radius of Curvature | Axial Distance | | Refractive Index | | Abbe Number |
|---|---|---|---|---|---|---|
| r1 | −279.518 | | | | | |
| | | d1 | 1.058 | N1 1.58913 | v1 | 61.11 |
| r2 | 25.653 | | | | | |
| | | d2 | 3.502 | | | |
| r3 | 28.452 | | | | | |
| | | d3 | 3.910 | N2 1.52510 | v2 | 56.38 |
| r4 | 96.464 | | | | | |
| | | d4 | 3.500 to 3.500 to 3.500 | | | |
| r5 | ∞ (Stop diaphragm) | | | | | |
| | | d5 | 22.723 to 11.050 to 1.500 | | | |
| r6 | 33.827 | | | | | |
| | | d6 | 6.042 | N3 1.48749 | v3 | 70.44 |
| r7 | 1329.610 | | | | | |
| | | d7 | 0.100 | | | |
| r8 | 87.396 | | | | | |
| | | d8 | 8.070 | N4 1.51680 | v4 | 64.20 |
| r9 | −114.963 | | | | | |
| | | d9 | 5.405 | | | |
| r10* | 51.597 | | | | | |
| | | d10 | 2.910 | N5 1.58340 | v5 | 30.23 |
| r11* | 25.565 | | | | | |
| | | Σd = 57.221 to 45.548 to 35.998 | | | | |

Aspherical Coefficients r10: ε = 1.0000
A4 = −0.21166 × 10$^{-4}$
A6 = −0.14783 × 10$^{-6}$
A8 = 0.16889 × 10$^{-8}$
A10 = −0.94046 × 10$^{-11}$
A12 = 0.23910 × 10$^{-13}$
A14 = −0.19948 × 10$^{-16}$
r11: ε = 0.0
A4 = −0.10976 × 10$^{-4}$
A6 = −0.12430 × 10$^{-6}$
A8 = 0.13886 × 10$^{-8}$
A10 = −0.62975 × 10$^{-11}$
A12 = 0.93902 × 10$^{-14}$
A14 = 0.11875 × 10$^{-16}$
A16 = −0.27195 × 10$^{-19}$

TABLE 2

(2nd Embodiment)

f = 95.0 to 119.0 to 150.0    FNO = 8.80 to 11.02 to 13.89

| | Radius of Curvature | Axial Distance | | Refractive Index | | Abbe Number |
|---|---|---|---|---|---|---|
| r1 | −192.404 | | | | | |
| | | d1 | 1.090 | N1 1.58913 | v1 | 61.11 |
| r2 | 23.915 | | | | | |
| | | d2 | 3.503 | | | |
| r3 | 27.076 | | | | | |
| | | d3 | 3.935 | N2 1.52510 | v2 | 56.38 |
| r4 | 89.163 | | | | | |
| | | d4 | 3.500 to 3.500 to 3.500 | | | |
| r5 | ∞ (Stop diaphragm) | | | | | |
| | | d5 | 17.946 to 8.900 to 1.500 | | | |
| r6 | 36.863 | | | | | |
| | | d6 | 6.035 | N3 1.48749 | v3 | 70.44 |
| r7 | −591.128 | | | | | |
| | | d7 | 0.100 | | | |
| r8 | 69.693 | | | | | |
| | | d8 | 8.055 | N4 1.51680 | v4 | 64.20 |
| r9 | −102.695 | | | | | |
| | | d9 | 5.374 | | | |
| r10* | 51.548 | | | | | |
| | | d10 | 2.909 | N5 1.58340 | v5 | 30.23 |
| r11* | 24.695 | | | | | |
| | | Σd = 52.447 to 43.401 to 36.001 | | | | |

Aspherical Coefficients r10: ε = 1.0000
A4 = −0.21144 × 10$^{-4}$
A6 = −0.14834 × 10$^{-6}$
A8 = 0.16892 × 10$^{-8}$
A10 = −0.93879 × 10$^{-11}$
A12 = 0.22957 × 10$^{-13}$
A14 = −0.16219 × 10$^{-16}$
r11: ε = 0.0
A4 = −0.10983 × 10$^{-4}$
A6 = −0.12429 × 10$^{-6}$
A8 = 0.13880 × 10$^{-8}$
A10 = −0.63101 × 10$^{-11}$
A12 = 0.86841 × 10$^{-14}$
A14 = 0.12597 × 10$^{-16}$
A16 = −0.18147 × 10$^{-19}$

TABLE 3

(3rd Embodiment)

f = 95.0 to 119.0 to 150.0    FNO = 8.80 to 11.02 to 13.90

| | Radius of Curvature | Axial Distance | | Refractive Index | | Abbe Number |
|---|---|---|---|---|---|---|
| r1 | −178.959 | | | | | |
| | | d1 | 1.220 | N1 1.58913 | v1 | 61.11 |
| r2 | 21.149 | | | | | |
| | | d2 | 3.500 | | | |
| r3 | 24.150 | | | | | |
| | | d3 | 4.020 | N2 1.52510 | v2 | 56.38 |
| r4 | 66.279 | | | | | |
| | | d4 | 3.500 to 3.500 to 3.500 | | | |
| r5 | ∞ (Stop diaphragm) | | | | | |
| | | d5 | 13.459 to 6.881 to 1.501 | | | |
| r6 | 40.350 | | | | | |
| | | d6 | 6.120 | N3 1.48749 | v3 | 70.44 |
| r7 | −211.119 | | | | | |
| | | d7 | 0.200 | | | |
| r8 | 61.574 | | | | | |
| | | d8 | 8.130 | N4 1.51680 | v4 | 64.20 |
| r9 | −86.966 | | | | | |
| | | d9 | 5.430 | | | |
| r10* | 51.282 | | | | | |
| | | d10 | 2.910 | N5 1.58340 | v5 | 30.23 |
| r11* | 24.437 | | | | | |
| | | Σd = 48.489 to 41.911 to 36.531 | | | | |

Aspherical Coefficients r10: ε = 1.0000
A4 = −0.21224 × 10$^{-4}$
A6 = −0.14943 × 10$^{-6}$
A8 = 0.16887 × 10$^{-8}$
A10 = −0.93263 × 10$^{-11}$
A12 = 0.22917 × 10$^{-13}$
A14 = −0.17056 × 10$^{-16}$
r11: ε = 0.0
A4 = −0.10957 × 10$^{-4}$
A6 = −0.12423 × 10$^{-6}$
A8 = 0.13882 × 10$^{-8}$
A10 = −0.63136 × 10$^{-11}$
A12 = 0.85119 × 10$^{-14}$
A14 = 0.15168 × 10$^{-16}$
A16 = −0.26895 × 10$^{-19}$

TABLE 4

(4th Embodiment)

f = 95.0 to 119.0 to 150.0    FNO = 8.80 to 11.02 to 13.89

| | Radius of Curvature | Axial Distance | | Refractive Index | | Abbe Number |
|---|---|---|---|---|---|---|
| r1 | −78.340 | | | | | |
| | | d1 | 1.031 | N1 | 1.58913 | ν1 61.11 |
| r2 | 20.770 | | | | | |
| | | d2 | 3.505 | | | |
| r3 | 25.044 | | | | | |
| | | d3 | 3.962 | N2 | 1.52510 | ν2 56.38 |
| r4 | 84.902 | | | | | |
| | | d4 | 3.500 to 3.500 to 3.500 | | | |
| r5 | ∞ (Stop diaphragm) | | | | | |
| | | d5 | 10.042 to 5.344 to 1.500 | | | |
| r6 | 54.163 | | | | | |
| | | d6 | 6.088 | N3 | 1.48749 | ν3 70.44 |
| r7 | −45.990 | | | | | |
| | | d7 | 0.151 | | | |
| r8 | 41.766 | | | | | |
| | | d8 | 8.088 | N4 | 1.51680 | ν4 64.20 |
| r9 | 9521.085 | | | | | |
| | | d9 | 5.362 | | | |
| r10* | 53.638 | | | | | |
| | | d10 | 2.905 | N5 | 1.58340 | ν5 30.23 |
| r11* | 22.154 | | | | | |
| | Σd = 44.633 to 39.935 to 36.091 | | | | | |

Aspherical Coefficients r10: ε = 1.0000
A4 = −0.21198 × 10$^{-4}$
A6 = −0.14940 × 10$^{-6}$
A8 = 0.16924 × 10$^{-8}$
A10 = −0.93646 × 10$^{-11}$
A12 = 0.22178 × 10$^{-13}$
A14 = −0.14868 × 10$^{-16}$
r11: ε = 0.0
A4 = −0.10965 × 10$^{-4}$
A6 = −0.12427 × 10$^{-6}$
A8 = 0.13872 × 10$^{-8}$
A10 = −0.63246 × 10$^{-11}$
A12 = 0.79294 × 10$^{-14}$
A14 = 0.10519 × 10$^{-16}$
A16 = −0.22989 × 10$^{-20}$

TABLE 5

(5th Embodiment)

f = 95.0 to 119.0 to 150.0    FNO = 8.80 to 11.02 to 13.89

| | Radius of Curvature | Axial Distance | | Refractive Index | | Abbe Number |
|---|---|---|---|---|---|---|
| r1 | −79.016 | | | | | |
| | | d1 | 1.034 | N1 | 1.58913 | ν1 61.11 |
| r2 | 19.576 | | | | | |
| | | d2 | 3.505 | | | |
| r3 | 23.700 | | | | | |
| | | d3 | 3.963 | N2 | 1.52510 | ν2 56.38 |
| r4 | 72.286 | | | | | |
| | | d4 | 3.500 to 3.500 to 3.500 | | | |
| r5 | ∞ (Stop diaphragm) | | | | | |
| | | d5 | 9.117 to 4.927 to 1.500 | | | |
| r6 | 59.036 | | | | | |
| | | d6 | 6.089 | N3 | 1.48749 | ν3 70.44 |
| r7 | −42.994 | | | | | |
| | | d7 | 0.152 | | | |
| r8 | 40.804 | | | | | |
| | | d8 | 8.089 | N4 | 1.51680 | ν4 64.20 |
| r9 | −620.243 | | | | | |
| | | d9 | 5.364 | | | |
| r10* | 53.789 | | | | | |
| | | d10 | 2.905 | N5 | 1.58340 | ν5 30.23 |

TABLE 5-continued (5th Embodiment)

f = 95.0 to 119.0 to 150.0    FNO = 8.80 to 11.02 to 13.89

| | Radius of Curvature | Axial Distance | Refractive Index | Abbe Number |
|---|---|---|---|---|
| r11* | 21.906 | | | |
| | Σd = 43.718 to 39.528 to 36.101 | | | |

Aspherical Coefficients r10: ε = 1.0000
A4 = −0.21201 × 10$^{-4}$
A6 = −0.14938 × 10$^{-6}$
A8 = 0.16926 × 10$^{-8}$
A10 = −0.93664 × 10$^{-11}$
A12 = 0.22122 × 10$^{-13}$
A14 = −0.15424 × 10$^{-16}$
r11: ε = 0.0
A4 = −0.10965 × 10$^{-4}$
A6 = −0.12427 × 10$^{-6}$
A8 = 0.13872 × 10$^{-8}$
A10 = −0.63245 × 10$^{-11}$
A12 = 0.79407 × 10$^{-14}$
A14 = 0.10563 × 10$^{-16}$
A16 = −0.68916 × 10$^{-20}$

TABLE 6

| | | | Overall Length of Lens System | | Zooming Movement Amount (W→T) | | Focusing Movement |
|---|---|---|---|---|---|---|---|
| | $\alpha_1$ | $f_w$ | W | T | Front Lens Unit | Rear Lens Unit | Amount |
| 1st Embodiment | −0.011 | −1.2 × 10$^{-4}$ | 159.8 | 175.2 | 15.8 | 37.0 | 8.99 |
| 2nd Embodiment | −0.013 | −1.4 × 10$^{-4}$ | 156.1 | 179.3 | 23.6 | 40.0 | 6.49 |
| 3rd Embodiment | −0.016 | −1.7 × 10$^{-4}$ | 153.2 | 185.3 | 32.1 | 44.0 | 4.48 |
| 4th Embodiment | −0.0195 | −2.1 × 10$^{-4}$ | 148.6 | 186.4 | 38.2 | 46.7 | 2.93 |
| 5th Embodiment | −0.021 | −2.2 × 10$^{-4}$ | 149.3 | 189.5 | 40.7 | 48.3 | 2.54 |

What is claimed is:

1. A zoom lens system comprising, in order from the object side to the image side:

a first, most object side lens unit, having a negative refractive power, which moves along an optical axis during a zooming operation;

a stop diaphragm which moves along the optical axis with the first lens unit as one body during the zooming operation; and a second lens unit having a positive refractive power, wherein the most object side lens of the second lens unit has a positive refractive power, and the most image side lens of the second lens unit has a negative refractive power.

2. The zoom lens system as claimed in claim 1, wherein a focusing operation is achieved by moving the first lens unit, and said zoom lens system fulfills the following condition:

$$-2.5 \times 10^{-2} < \alpha_1 < -0.8 \times 10^{-2}$$

wherein:

$\alpha_1$: refractive power of the first lens unit.

3. The zoom lens system as claimed in claim 1, wherein a focusing operation is achieved by moving the first lens unit, and said zoom lens system fulfills the following condition:

$$-2.5 \times 10^{-4} < \frac{\alpha_1}{f_w} < -0.8 \times 10^{-4}$$

wherein:

$\alpha_1$: refractive power of the first lens unit; and $f_W$: shortest focal length of the zoom lens system.

4. The zoom lens system as claimed in claim 1, wherein the first lens unit includes two spherical lenses.

5. The zoom lens system as claimed in claim 1, wherein the second lens unit includes an aspherical surface.

6. The zoom lens system as claimed in claim 1, wherein the first lens unit includes a plastic lens of a positive refractive power, and the second lens unit includes a plastic lens of a negative refractive power.

7. The zoom lens system as claimed in claim 1, wherein an air space between the first and second lens units is varied during a zooming operation.

8. The zoom lens system as claimed in claim 1, wherein the first lens unit consists of, in order from the object side to the image side, a negative lens and a positive lens.

9. A zoom lens system comprising, in order from the object side:

a first lens unit, having a negative refractive power, which moves along an optical axis during a zooming operation, the first lens unit having a biconcave lens element at the most object side, said first lens unit being disposed at the most object side of the zoom lens system;

a stop diaphragm which moves along the optical axis with the first lens unit as one body during the zooming operation; and a second lens unit having a positive refractive power, and wherein the most object side lens of the second lens unit has a positive refractive power, and wherein the most image side lens of the second lens unit has a negative refractive power.

10. The zoom lens unit of claim 9, wherein the first lens unit moves along the optical axis to provide a focusing operation.

11. A zoom lens system consisting of, in order from the object side:

a first lens unit, having a negative refractive power, which moves along an optical axis during a zooming operation;

a stop diaphragm which moves along the optical axis with the first lens unit as one body during the zooming operation; and a second lens unit having a positive refractive power, and wherein the most object side lens of the second lens unit has a positive refractive power, and wherein the most image side lens of the second lens unit has a negative refractive power.

12. The zoom lens unit of claim 11, wherein the first lens unit moves along the optical axis to provide a focusing operation.

13. The zoom lens system as claimed in claim 12, wherein the first lens unit consists of, in order from the object side to the image side, a negative lens and a positive lens.

14. The zoom lens system as claimed in claim 13, wherein the first lens unit includes a plastic lens of a positive refractive power, and the second lens unit includes a plastic lens of a negative refractive power.

15. The zoom lens system as claimed in claim 14, wherein the first lens unit includes two spherical lenses, and the second lens unit includes an aspherical surface.

16. A zoom lens system comprising, in order from the object side to the image side:

a first lens unit, having a negative refractive power, which moves along an optical axis during a zooming operation and also is moved to provide a focusing operation;

a stop diaphragm which moves along the optical axis with the first lens unit during the zooming operation; and a second lens unit having a positive refractive power, wherein the zoom lens system fulfills the following condition:

$$-2.5 \times 10^{-4} < \frac{\alpha_1}{f_w} > -0.8 \times 10^{-4}$$

wherein $a_1$: refractive power of the first lens unit; and $f_w$: shortest focal length of the zoom lens system.

17. A zoom lens system comprising, in order from the object side to the image side:

a first, most object side lens unit, having a negative refractive power, which moves along an optical axis during a zooming operation;

a stop diaphragm which moves along the optical axis with the first lens unit as one body during the zooming operation;

a second lens unit having a positive refractive power, wherein a focusing operation is achieved by moving the first lens unit, and said zoom lens system fulfills the following condition:

$$-2.5 \times 10^{-4} < \frac{\alpha_1}{f_w} < -0.8 \times 10^{-4}$$

wherein $\alpha_1$: refractive power of the first lens unit; and $f_w$: shortest focal length of the zoom lens system.

* * * * *